Nov. 30, 1954  C. T. GILBERT  2,695,462
EDUCATIONAL TOY
Filed Feb. 28, 1952
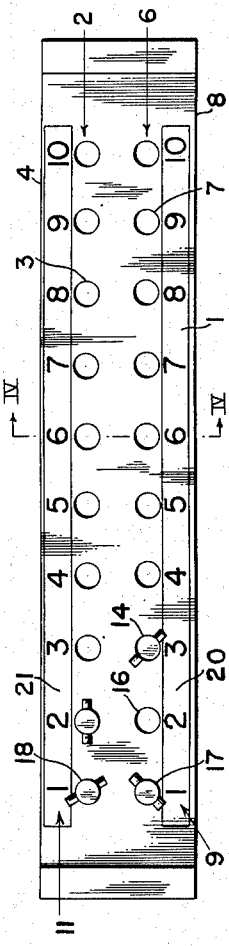
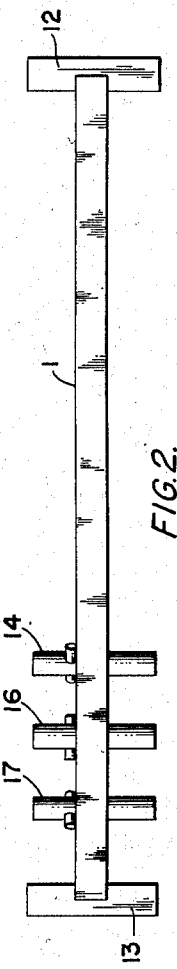
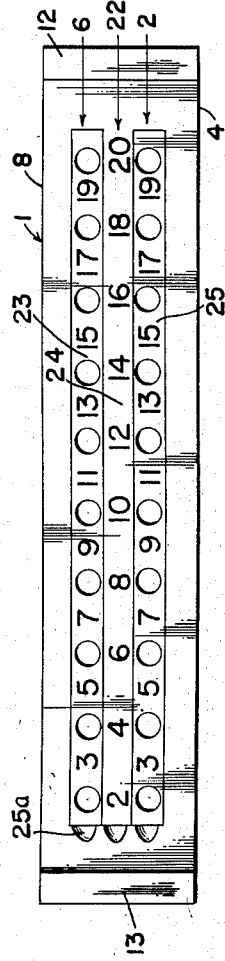
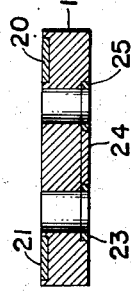
INVENTOR
CHARLES T. GILBERT
BY Winston E. Miller
ATTORNEY

United States Patent Office 2,695,462
Patented Nov. 30, 1954

2,695,462

EDUCATIONAL TOY

Charles T. Gilbert, Saginaw, Mich.

Application February 28, 1952, Serial No. 273,887

4 Claims. (Cl. 35—31)

This device relates to an educational and amusement device for children and relates particularly to such a device intended for instructing a child in recognizing numerals, counting, and practicing arithmetic.

A principal object of the invention is to provide a device by which a small child can simultaneously entertain himself and learn to recognize and manipulate numbers.

A further object of the invention is to provide such a device having parts of sufficient size and sufficient simplicity that they can be readily manipulated by small children.

A further object of the invention is to provide a device, as aforesaid, of sufficient structural simplicity that it can be made economically.

A further object of the invention is to provide a device, as aforesaid, of such character that it can be made sufficiently rugged to withstand substantial abuse.

More specifically, the object of the invention is to provide a peg board provided with spaced apertures and pegs so that the pegs may be shifted from aperture to aperture in accordance with prearranged numerical designation upon the board to yield simple arithmetic results. The overall object is to combine an educational apparatus in a toy form which will coincidentally accentuate the idea of teaching the child at play.

Other objects and purposes of the invention will be apparent to persons acquainted with devices of this general type upon reading the following disclosure and inspection of the accompanying drawing.

In the drawing:

Figure 1 represents a top view of a specific embodiment of my invention.

Figure 2 represents a side view of said embodiment of my invention.

Figure 3 represents a bottom view of said embodiment of my invention.

Figure 4 represents a cross-sectional elevation taken along the line IV—IV of Figure 1.

For purposes of convenience in reference and with no thought of limitation, the following terminology will be employed: The terms "rightward" and "leftward" and derivatives thereof will refer to the device as appearing in any of the figures; the term "face side" will refer to the side of the device appearing in Figure 1; and the term "reverse side" will refer to the side shown in Figure 3.

In providing a device carrying out the objects and purposes above set forth I have provided a generally rectangular panel 1 having a row 2 of openings 3 along an edge 4 thereof and a second row 6 of openings 7 along the opposite edge 8 thereof. The several openings of each of said rows are each numbered consecutively by rows 9 and 11 of numerals as shown. The several openings of each of said rows 2 and 6 are positioned oppositely to each other on a line perpendicular to the longitudinal extent of the panel 1 and each of said oppositely positioned openings are similarly numbered.

At each end of said panel 1 are end supports 12 and 13 which are affixed to said panel in any convenient manner, as by gluing or nailing.

On the reverse side of said panel 1 there are placed alternate odd numerals between the respective openings 3 of each of the rows 2 and 6, similar numerals being placed opposite each other substantially on the line perpendicular to the longitudinal extent of the panel 1. Intermediate the pairs of oppositely positioned openings are located a row 22 of even numerals, as shown, the numeral 2 being positioned between the openings designated by the numeral 1 on the face of the device, the numeral 4 being positioned between the openings designated by the numerals 2 on the face of the device and so on through all of said openings utilized in any particular embodiment.

Thus, it will be observed that the numeral located on the reverse side of the panel 1 between any pair of adjacent openings is the sum of the numerals located on the face of the device adjacent the same pair of openings.

A plurality of marker pegs, as marker pegs 14, 16, 17 and 18, are provided to extend through said openings for identifying a given opening on both sides of the device. In order to change groups of numbers readily for adapting the device to different number groupings and varying mathematical operations, it is preferable to locate said groups of numbers on strips which can be removed from the base panel 1 and replaced by other strips bearing other groups of numbers. Thus, the row 11 of numbers may be placed upon a strip 20 which, as shown in Figure 4, is received in a suitable recess in the base panel 1. The row 9 of numbers is similarly arranged on a strip 21 which is also received in a suitable recess within the base panel 1. The row 22, and the numerals intermediate the openings comprising the rows 2 and 6, are similarly placed on removable strips, as the strips 23, 24 and 25.

Any convenient means, as the cut-out finger space 25A placed at an end of each strip, may be provided to assist in removing a given strip from the base panel 1 for replacement or, if desired, other well known means may be employed.

In using this apparatus, and with number strips as shown in place, a pair of pegs may be placed, as pegs 17 and 18, into the openings adjacent the numerals 1 on the face of the device. The device is then turned over and the numeral 2 appears between said pegs 17 and 18. Thus, the child is informed that the sum of 1 and 1 is 2. Similarly, a pair of pegs may be placed in a hole adjacent the numeral 1 and in a hole adjacent the numeral 2. When the device is again turned over the numeral 3 will be found between said pegs 16 and 17. Thus, the child is advised that the sum of 1 and 2 is 3. Similar operations may be performed throughout the entire board by placing the pegs into any pair of openings which are adjacent to each other either in a direction parallel with the longitudinal extent of the panel 1 or in a direction perpendicular thereto, and the sum of said numbers will be found on the reverse side of the panel intermediate said pegs.

While the specific example herein utilized for illustrative purposes has been directed toward addition of the same or of adjacent numbers, it will be recognized that modifications can readily be made for providing drill and practice in the addition of other groups of numbers.

Further, it will be recognized that still further modifications in the arrangement of numerals can be provided for providing drill in subtraction, or other arithmetical operations, instead of addition. It will also be recognized that the utilizing of numerals from 1 to 10 inclusive in this particular embodiment is by way of example only and that other numerals may be used either in addition to the numerals herein indicated or in place of such numerals.

Accordingly, I have provided a device meeting the objects and purposes above set forth.

While a specific embodiment has been herein utilized for illustrative purposes it will be apparent that various modifications may be made to said device within the scope of the hereinafter appended claims.

I claim:

1. In an educational device, the combination comprising: a panel having a row of openings therethrough; a plurality of marker pegs insertable and displaceable in said openings in said panel; numerical indicia arranged adjacent each of said openings on one side of said panel; further numerical indicia arranged on the opposite side of said panel intermediate adjacent openings, the numerical indicia located between peg marked pair of adjacent openings bearing a predetermined mathematical relationship with the indicia located on the one side of said panel and adjacent said same pair of openings.

2. In an educational device, the combination comprising: a panel having a row of openings therethrough; a plurality of marker pegs insertable and displaceable in said openings in said panel; numerical indicia arranged adjacent each of said openings on one side of said panel; further numerical indicia arranged on the opposite side of said panel intermediate adjacent openings, the numerical indicia located between any peg marked pair of adjacent openings representing the sum of the indicia located on the one side of said panel and adjacent said same pair of openings.

3. In an educational device, the combination comprising: a panel; two parallel rows of openings arranged in said panel, each opening of each of said rows being opposite a corresponding opening in the other of said rows; a plurality of marker pegs insertable and displaceable in said openings in said panel; numerical indicia positioned adjacent each of said openings on the face of said panel; numerical indicia on the reverse side of said panel located between each pair of adjacent openings, said last named indicia bearing a predetermined mathematical relationship with the indicia located on the face side of said device and adjacent said same pair of openings.

4. In an educational device, the combination comprising: a panel having a row of openings therethrough; a plurality of marker pegs insertable and displaceable in said openings in said panel; first removable means bearing numerical indicia arranged adjacent each of said openings on one side of said panel; second removable means bearing further numerical indicia arranged on the opposite side of said panel intermediate adjacent openings, the numerical indicia located between any peg marked pair of adjacent openings bearing a predetermined mathematical relationship with the indicia located on the one side of said panel and adjacent said same pair of openings.

References Cited in the file of this patent

UNITED STATES PATENTS

| Number | Name | Date |
|---|---|---|
| 1,624,450 | Vershbinsky | Apr. 12, 1927 |
| 2,514,636 | Glaze | July 11, 1950 |